United States Patent [19]

Sirai

[11] Patent Number: 4,499,564
[45] Date of Patent: Feb. 12, 1985

[54] PATTERN COMPARISON ULTRASONIC SURVEILLANCE SYSTEM WITH NOISE SUPPRESSION

[75] Inventor: Sirou Sirai, Fukushima, Japan

[73] Assignee: Secom Co., Ltd., Tokyo, Japan

[21] Appl. No.: 341,982

[22] PCT Filed: Aug. 20, 1980

[86] PCT No.: PCT/JP80/00188
§ 371 Date: Jan. 7, 1982
§ 102(e) Date: Jan. 7, 1982

[87] PCT Pub. No.: WO82/00727
PCT Pub. Date: Mar. 4, 1982

[51] Int. Cl.³ .............................................. G08B 13/16
[52] U.S. Cl. ...................................... 367/93; 340/552; 343/5 PD
[58] Field of Search .......................... 367/93; 340/552; 343/5 PD

[56] References Cited

U.S. PATENT DOCUMENTS

| | | | |
|---|---|---|---|
| 3,885,234 | 5/1975 | Fujimoto | 343/5 PD |
| 3,967,283 | 6/1976 | Clark et al. | |
| 3,987,427 | 10/1976 | Clift | |
| 4,016,529 | 4/1977 | Inuzuka et al. | |
| 4,028,690 | 6/1977 | Buckley et al. | |
| 4,131,872 | 12/1978 | Inoue et al. | |
| 4,142,188 | 2/1979 | Zetting et al. | |
| 4,168,496 | 9/1979 | Lightblau | 343/5 PD |
| 4,382,291 | 5/1983 | Nakauchi | 340/552 |

FOREIGN PATENT DOCUMENTS 54-138000 10/1979 Japan .

Primary Examiner—Glen R. Swann, III
Attorney, Agent, or Firm—Armstrong, Nikaido, Marmelstein & Kubovcik

[57] ABSTRACT

An ultrasonic surveillance system which emits pulse-like ultrasonic waves to an area under surveillance, which statistically compares a reflected-wave pattern established by receiving ultrasonic waves reflected from the under surveillance with a predetermined reference pattern, and which produces an alarm signal when these two patterns are not in agreement. According to this system, the alarm signal is prevented from being erroneously produced by ultrasonic noises.

5 Claims, 37 Drawing Figures

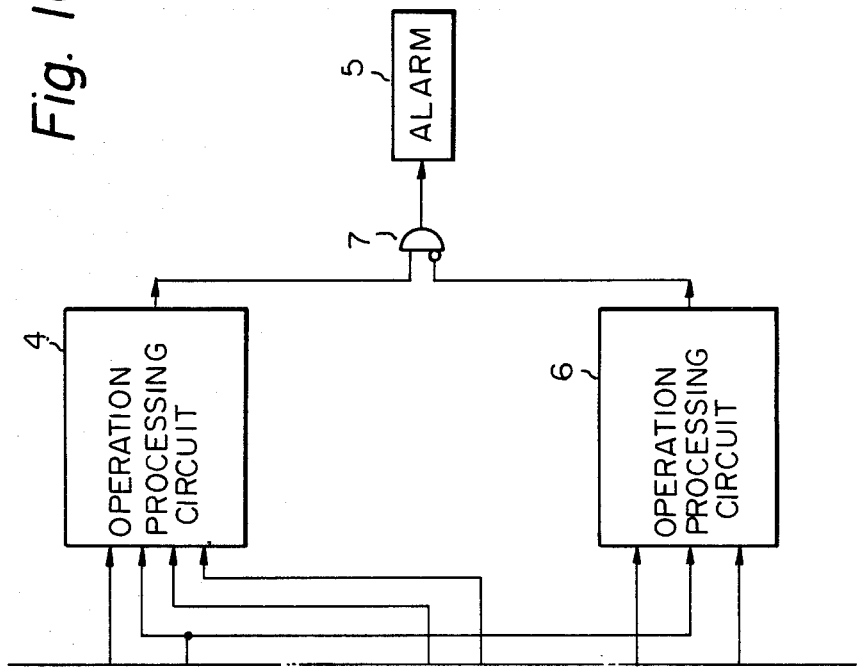

PATTERN COMPARISON ULTRASONIC SURVEILLANCE SYSTEM WITH NOISE SUPPRESSION

DESCRIPTION

1. Technical Field

The present invention relates to an ultrasonic surveillance system and, more particularly, to an ultrasonic surveillance system utilizing pulse-like ultrasonic waves.

2. Background Art

Ultrasonic waves have often been utilized for modern surveillance systems which produce alarms when an unauthorized person enters into predetermined areas. There has heretofore been proposed an ultrasonic surveillance system of this type utilizing the Doppler effect. According to this system, ultrasonic waves of a predetermined frequency are continuously emitted into an area under surveillance which may be in a room, and when frequency components different from the predetermined frequency are detected being superposed on the waves which are reflected by the objects in the area under surveillance, the presence of said unauthorized person in the area under surveillance is detected, and the alarm, such as a buzzer, is energized. Such a system utilizes the Doppler effect, according to which the frequency of the reflected waves increases when an object approaches the ultrasonic wave emitter, and the frequency of the reflected waves decreases when an object moves away from the ultrasonic wave emitter. In order for the alarm not to operate even when ultrasonic waves (hereinafter referred to as ultrasonic noise) generated by a telephone bell or a bell of fire alarm have infiltrated into the reflected waves, in other words, in order to prevent the alarm from being erroneously operated by ultrasonic noise, the above-mentioned system has been so designed that the received signals are detected in a frequency-modulated manner and are allowed to pass through a low-pass filter to remove the frequency components caused by the ultrasonic noise, since the frequency components (period in the change of frequency) of the ultrasonic noise are much greater than the frequency components of the reflected waves.

There has also been proposed an ultrasonic surveillance system utilizing pulse-like ultrasonic waves. According to this system, pulse-like ultrasonic waves are emitted to an area under surveillance, waves reflected by the objects in the area under surveillance are received to compare the pattern of the reflected waves with a predetermined reference pattern statistically, and an alarm is produced when the two patterns are not in agreement. With this system, however, the ultrasonic noises are not removed even when the received signals are allowed to pass through the low-pass filter, since the frequency components of ultrasonic noises are superposed on the frequency components of reflected waves. Therefore, when the ultrasonic noises infiltrate into the reflected waves, the pattern of the reflected waves is changed to erroneously produce the alarm. Accordingly, in a room where ultrasonic noises are likely to be produced, a limitation is imposed on the place for installing such a surveillance device. Further, even if it is installed at a position which is considered to be acceptable, the surveillance device may erroneously operate, thus decreasing the reliability of the device.

DISCLOSURE OF THE INVENTION

The object of the present invention is to provide an ultrasonic surveillance system having high reliability, which will not be erroneously operated by ultrasonic noises that are generated by a telephone bell or by a bell of a fire alarm.

According to the present invention, there is provided an ultrasonic surveillance system comprising a transmitter means which transmits pulse-like ultrasonic waves to an area under surveillance, receiving means which receives ultrasonic waves reflected from the area under surveillance and which subjects the signals of ultrasonic waves to analog-to-digital conversion, and a first operation processing means which compares a pattern of reflected waves established by the digital signals sent from the receiving means with a reference pattern statistically and which produces an alarm signal when the two patterns are not in agreement, wherein the improvement is characterized by the provision of means for preventing erroneous operation by preventing the alarm signal from being erroneously produced by the ultrasonic noises which are generated in the area under surveillance.

In the ultrasonic surveillance system according to the present invention, ultrasonic noise of a relatively small amplitude is offset by the difference between the output of a first frequency selection means and the output of a second frequency selection means. Ultrasonic noise of a relatively large amplitude is detected by integrating the output of the second frequency selection means; therefore, the analog-to-digital conversion operation of a receiver circuit is stopped so that an alarm signal is not generated. Furthermore, ultrasonic noise having a short period of variation is detected by counting peak values (maximum values or minimum values) in the output of the first frequency selection means, thereby to inhibit the production of an alarm signal. Thus, generation of alarm signals by ultrasonic noises is minimized to prevent erroneous operation of the alarm.

The invention will become more apparent from the following description with reference to the accompanying drawings.

BRIEF DESCRIPTION OF THE DRAWINGS

FIGS. 10A and 10B comprise a block diagram illustrating a third embodiment of the ultrasonic surveillance system according to the present invention.

BEST MODE FOR CARRYING OUT THE INVENTION

Figure 1A:
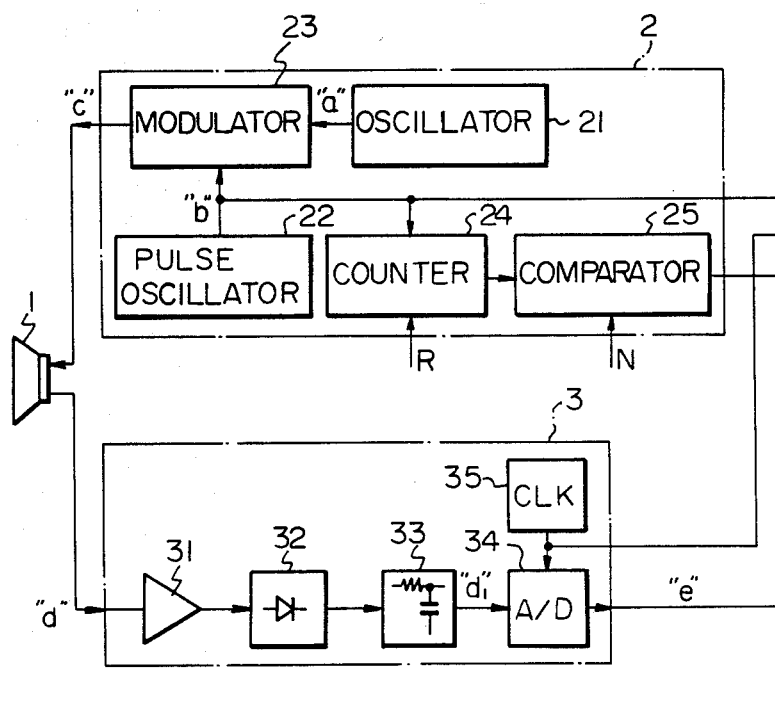
FIGS. 1A and 1B comprise a block diagram illustrating a general ultrasonic surveillance system utilizing pulse-like ultrasonic waves.
Figure 1B:
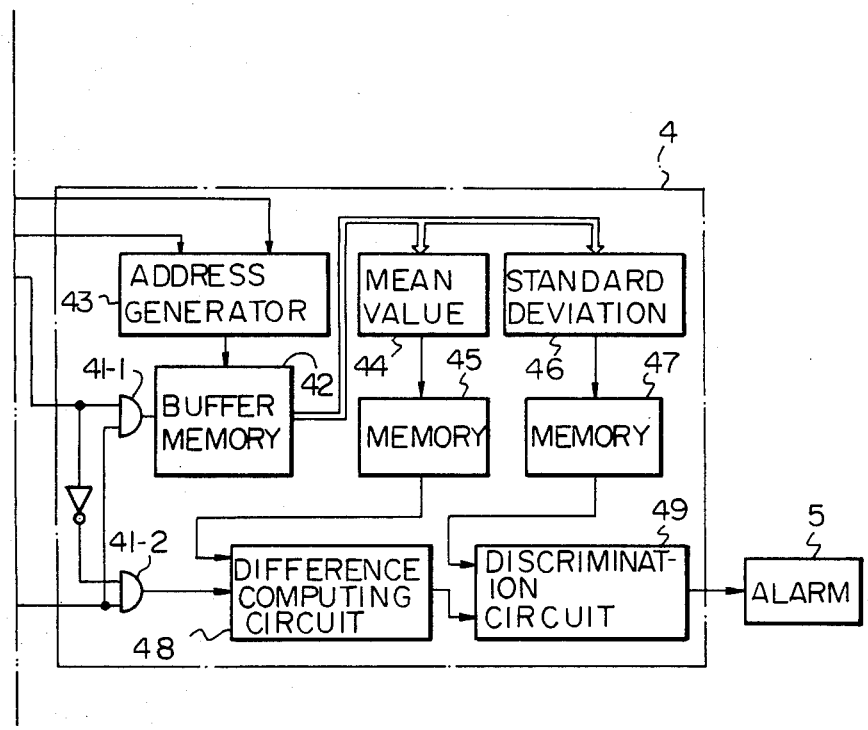

Referring to FIG. 1, which illustrates a general ultrasonic surveillance system utilizing pulse-like ultrasonic waves, the transmitting operation of an ultrasonic transmitter-receiver element (hereinafter referred to as ultrasonic element) 1 is controlled by a transmitter circuit 2. Ultrasonic waves emitted from the ultrasonic element 1 are reflected by desks, shelves and walls in an area under surveillance, and are received by the ultrasonic element 1. The reflected waves which are received are converted into digital signals by a receiver circuit 3, and are transmitted to an operation processing circuit 4 where a reference pattern is prepared based upon a pattern of reflected waves collected by the receiver circuit 3, and the pattern of reflected waves corresponding to the conditions in the area under surveillance is statistically compared with the reference pattern when the area is under surveillance. When the two patterns are not in agreement, the operation processing circuit 4 produces alarm signals to energize an alarm 5 such as buzzer.

Figure 2A:
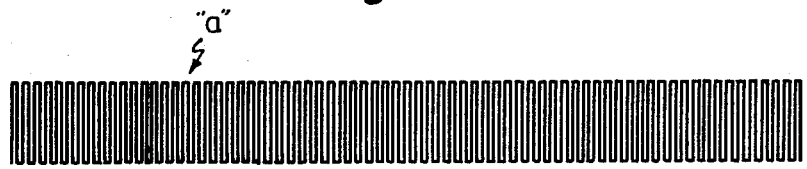
FIGS. 2A through 2D are diagrams illustrating timings of signals which appear in the circuit of FIG. 1.
Figure 2B:
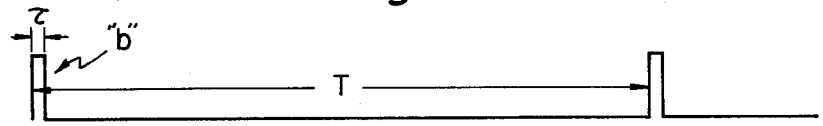
Figure 2C:
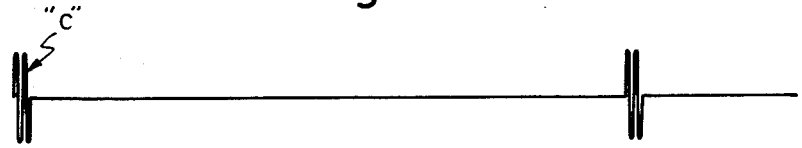

FIGS. 2A through 2D are time diagrams of signals which are produced in the circuit of FIG. 1. The circuit of FIG. 1 will now be described below with reference to FIGS. 2A through 2D. In the transmitter circuit 2, an oscillator 21 produces signals "a" of a frequency of 25 through 50 kHz, as illustrated in FIG. 2A, and a pulse oscillator 22 produces pulse-like signals "b" having a repetitive period T of the order of, for example, 100 milliseconds and a duration time of the order of several milliseconds, as illustrated in FIG. 2B. A modulator 23, therefore, produces signals "c" as illustrated in FIG. 2C. The signals emitted from the ultrasonic element 1, responsive to the signals "c", are reflected by the desks, shelves and walls in the area under surveillance, and these many reflected waves are received by the ultrasonic element 1 in a superposed manner, and are converted into electric signals "d".

Figure 2D:
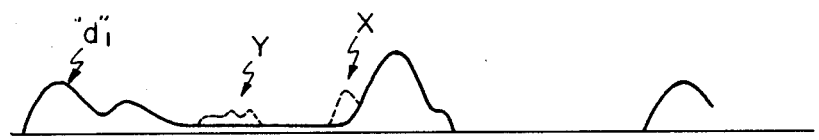

In the receiver circuit 3, the signal "d" is amplified by an amplifier 31, rectified by a rectifier 32 for amplitude-modulated detection, smoothed by a smoothing circuit 33, and is converted into analog signals "$d_1$" as illustrated in FIG. 2D. The analog signals "$d_1$" are sampled in an analog-to-digital converter 34 by clock pulses, with maintaining a predetermined time interval, generated from a clock oscillator 35, and are converted into digital signals "e".

In order to obtain a reference pattern based upon the reflected waves specific to the area under surveillance where there is no person present, a counter 24 in the transmitter circuit 2 is reset by a reset signal "R". The counter 24 counts the pulses generated by the pulse oscillator 22, and a comparator 25 compares the value of the counter 24 with a predetermined value N. When the value of the counter 24 is smaller than the predetermined value N, the comparator produces a signal of a high potential and when the value of the counter 24 is greater than the predetermined value N, the comparator 25 produces a signal of a low potential. Therefore, gates 41-1 and 41-2 of the operation processing circuit 4 are, respectively, opened and closed with respect to the digital signals "e" for a predetermined period of time after the counter 24 has been reset. Accordingly, the data of digital signals "e" is stored via the gate 41-1 in a buffer memory 42 at an address specified by an address generator 43. The address generator 43 is controlled by the pulse oscillator 22 of the transmitter circuit 2 and by the clock oscillator of the receiver circuit 3. Thus, the buffer memory 42 stores a plurality of reflected-wave patterns of a predetermined number of samples as reference patterns. The operation for storing a pattern is completed when the value of the counter 24 in the transmitter circuit 2 has reached a predetermined value. Thereafter, mean values of the constants stored in the buffer memory 42 are calculated by a mean value calculator circuit 44 for each sampling point, and the calculated results are stored in a memory 45. At the same time, standard deviations in the contents stored in the buffer memory 42 are calculated by standard deviation calculator circuit 46 for each sampling point, and the calculated results are stored in memory 47.

Next, since the output signal of the comparator 25 assumes a low potential, the gates 41-1 and 41-2 of the operation processing circuit 4 are, respectively, closed and opened for the digital signals "e". Consequently, the digital signals "e" are supplied to an input of difference computing circuit 48 via the gate 41-2, while another input of the difference computing circuit 48 is supplied with mean values for each sampling point from the memory 45. Therefore, the difference between the reflected-wave pattern from the receiver circuit 3 and the mean value of the reference pattern stored in the memory 45 is calculated for every sampling point. A discrimination circuit 49 compares the output of the difference computing circuit 48 with the data of standard deviation stored in the memory 47 for every sampling point. When the output of the circuit 48 is greater than the standard deviation, the discrimination circuit 49 produces an alarm signal to energize the alarm 5 such as a buzzer. As mentioned above, the reflected-wave pattern is statistically compared with the reference pattern which is stored in the buffer memory 42, and the alarm 5 is energized when the two patterns are not in agreement. Referring to FIG. 2D in which a solid line represents the reference pattern, the alarm 5 will be energized when, for example, a portion indicated by an arrow X emerges in the reflected-wave pattern due to the presence of a person who has entered the area under surveillance. The above-mentiond circuit, however, presents a problem in that the alarm 5 will be energized even when a portion indicated by an arrow Y appears in the reflected-wave pattern being caused by ultrasonic noise from a ringing bell of a telephone or a fire alarm.

The present invention was accomplished based upon the discovery that ultrasonic noise exhibits the following three phenomena.

I. Ultrasnoic noise having a relatively small amplitude such as of a ringing bell of a telephone is contained in the frequency band of ultrasonic waves emitted by the ultrasonic element and is also contained in other frequency bands.

II. Ultrasonic noise having a relatively large amplitude such as of a ringing bell of a fire alarm is mostly contained in frequency bands other than the frequency band of ultrasonic waves emitted by the ultrasonic element.

III. Ultrasonic noise appears in a reflected-wave pattern in the form of a wave of a relatively small period.

According to the present invention relying upon the phenomenon I, the reflected-wave pattern is formed based upon a difference between a pattern of frequency components of the emitted ultrasonic waves and a pattern of frequency components other than the above-mentioned frequency components, thereby to remove ultrasonic noise having relatively a small amplitude from the reflected-wave pattern. Therefore, the alarm can be prevented from being erroneously operated by an ultrasonic noise of relatively small amplitude. Utilizing the phenomenon II, furthermore, the alarm 5 can be prevented from being erroneously operated by an ultrasonic noise of relatively large amplitude by integrating the frequency components other than those of the emitted ultrasonic waves for a predetermined period of time, and stopping the analog-to-digital conversion of the reflected-wave pattern when the value of integration is greater than a predetermined value. Relying upon the phenomenon III, moreover, the number of maximum or minimum values in the reflected-wave pattern is counted to statistically compare the counted value with a reference value of a number of said values in the reference pattern. An alarm signal is not produced when the number of said values is greater than the reference value, thereby to prevent the alarm from being erroneously operated by the ultrasonic noise.

Figure 3A:
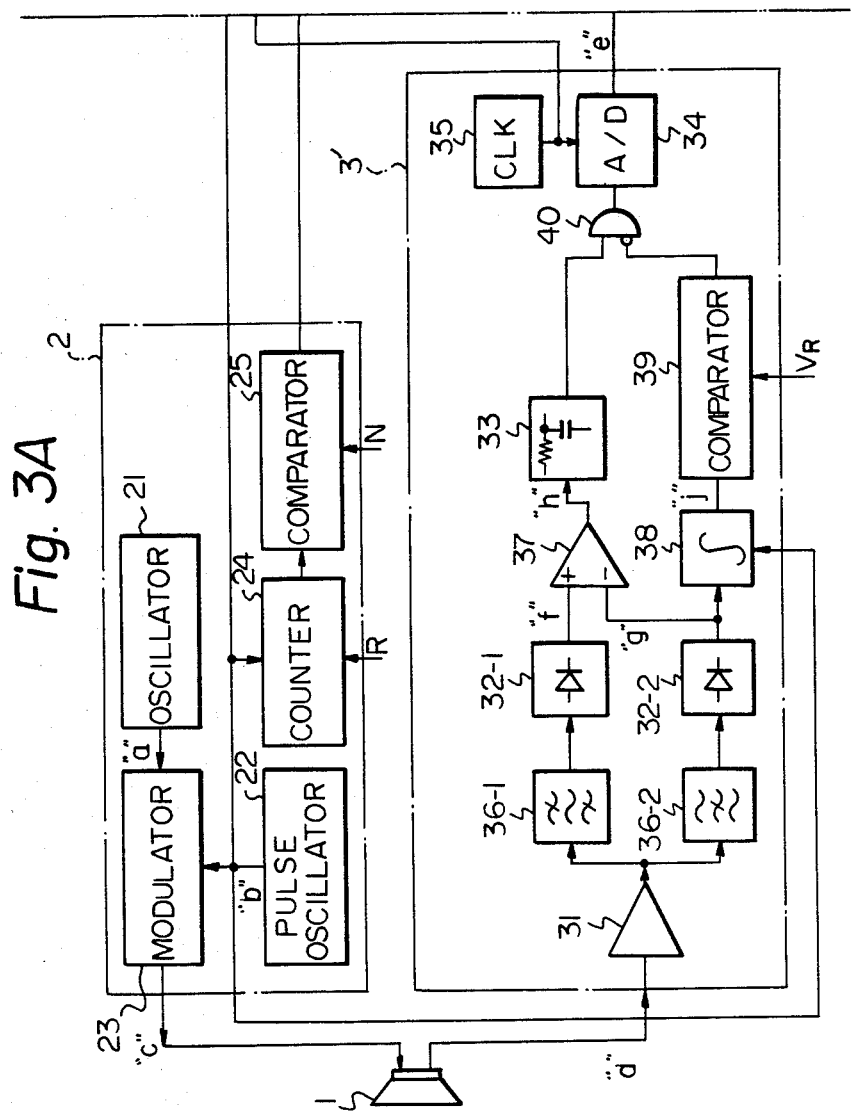
FIGS. 3A and 3B comprise a block diagram illustrating a first embodiment of the ultrasonic surveillance system according to the present invention.
Figure 3B:
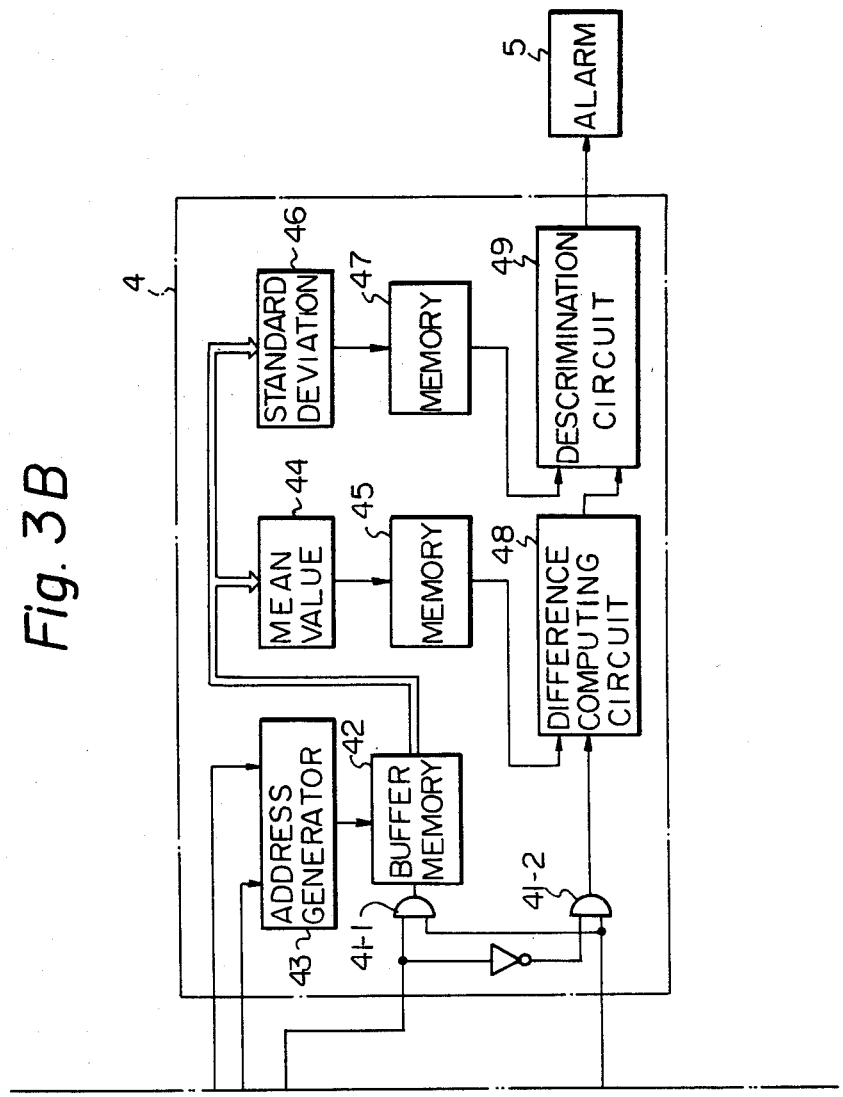

FIG. 3 is a block diagram illustrating a first embodiment of the ultrasonic surveillance system according to the present invention, in which the elements which are the same as those of FIG. 1 are denoted by the same reference numerals as those of FIG. 1. A receiver circuit 3' is different from the receiver circuit 3 of FIG. 1. In the receiver circuit 3', a band-pass filter 36-1 which serves as a first frequency selection means to permit the passage of frequency components of the emitted ultrasonic waves and a band-pass filter 36-2 which serves as a second frequency selection means to permit the passage of frequency components other than those of the emitted ultrasonic waves, are connected to the output of the amplifier 31. Output signals of the two band-pass filters 36-1 and 36-2 are rectified by rectifiers 32-1 and 32-2 for amplitude-modulated detection. A difference between an output signal "f" and an output signal "g" of the rectifiers 32-1 and 32-2, respectively, is detected by a differential amplifier 37, and an output signal "h" of the differential amplifier 37 is supplied to the smoothing circuit 33.

When an ultrasonic noise of a relatively small amplitude, such as of the ringing bell of a telephone is present in the area under surveillance, the wave-forms of the ultrasonic noise appear both in the band-pass filter 36-1 and in the band-pass filter 36-2. In this case, if the reflected-wave components in the output signal "f" of the rectifier 32-1 is denoted by S, the noise components by $N_1$, and the noise components in the output signal "g" of the rectifier 32-2 by $N_2$, the amplitude of the output signal "h" of the differential amplifier 37 is proportional to $S+(N_1-N_2)$. With reference to ultrasonic noises of relatively small amplitudes, such as of a ringing bell of a telephone, there is an intimate correlation between $N_1$ and $N_2$; noise components $N_1$ are set to be nearly equal to noise components $N_2$ by adjusting the amplitude and frequency characteristics and by adjusting the amplification factor of the band-pass filters 36-1 and 36-2. Therefore, the ultrasonic noises of relatively small amplitudes do not appear in the output of the differential amplifier 37.

Referring to the receiver circuit 3', furthermore, an integrator 38 and a comparator 39 are connected in the subsequent stages of the rectifier 32-2 to detect ultrasonic noises of relatively large amplitudes such as of a bell of a fire alarm. The amplitude of an output signal "j" of the integrator 38 increases with the increase in the output of the band-pass filter 36-2. As the amplitude exceeds a reference value $V_R$, the potential of the output signal of the comparator 39 is converted from a low level to a high level, whereby a gate 40 is closed to interrupt the analog-to-digital converter 34. Therefore, the analog-to-digital converter 34 discontinues the operation of analog-to-digital conversion, and the alarm 5 is prevented from being erroneously operated by the ultrasonic noises of relatively large amplitudes. Here, the integrator 38 is reset by the output signal "b" of the pulse oscillator 22 in the transmitter circuit 2.

Operation of the circuit of FIG. 3 will now be explained below in detail.

Figure 4A:
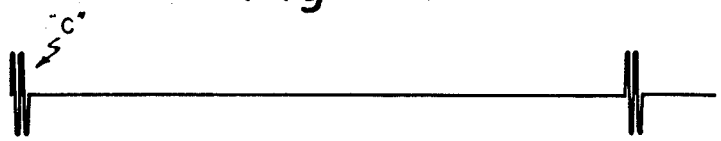
FIGS. 4A through 4E, 5A through 5E, 6A through 6E, and 7A through 7E are time diagrams of signals which appear in the circuit of FIG. 3.
Figure 4B:
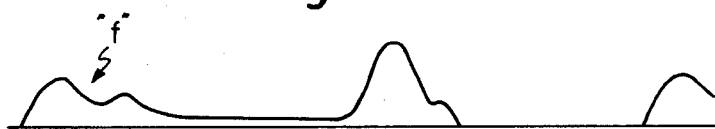
Figure 4C:
Figure 4D:
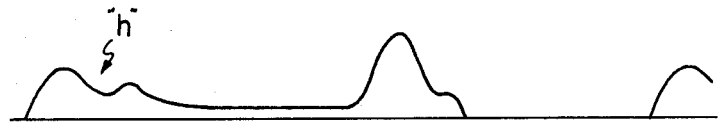
Figure 4E:
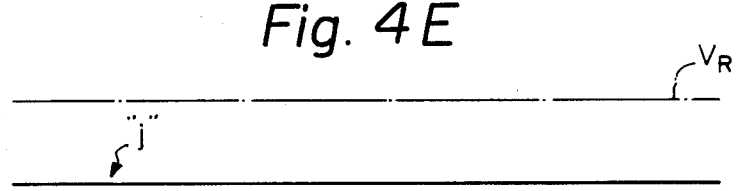

FIGS. 4A through 4E are diagrams illustrating timings of signals which are produced in the circuit of FIG. 3 when there is no person present in the area under surveillance and no ultrasonic noise is present. When the ultrasonic element 1 emits ultrasonic waves to the area under surveillance responsive to the modulated signal "c" illustrated in FIG. 4A, the rectifier 32-1 in the receiver circuit 3' produces the output signal "f" as illustrated in FIG. 4B. Here, since no ultrasonic noise is present, the potential of the output signal "g" of the rectifier 32-2 is maintained at zero as illustrated in FIG. 4C. As illustrated in FIG. 4D, therefore, the wave-form of an output signal "h" of the differential amplifier 37 resembles the wave-form of FIG. 4B. Further, since the potential of the output signal "g" of the rectifier 32-2 is zero, the potential of the output signal "j" of the integrator 38 is maintained at zero as illustrated in FIG. 4E. When the differential amplifier 37 produces the output signal "h" of the wave-form as illustrated in FIG. 4D, the operation processing circuit 4 determines that the reflected-wave pattern is the same as the reference pattern, and the alarm 5 is not energized.

Figure 5A:
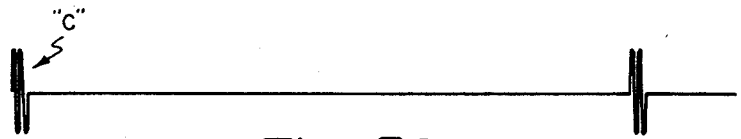
Figure 5B:
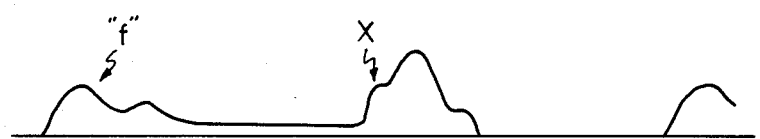
Figure 5C:
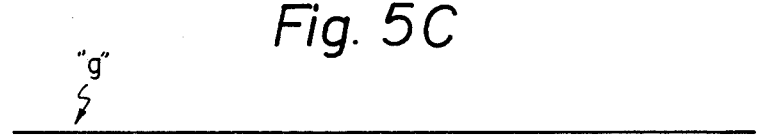
Figure 5D:
Figure 5E:
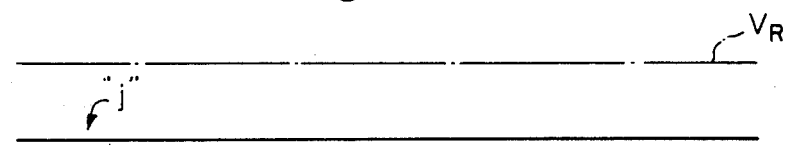

FIGS. 5A through 5E are diagrams illustrating timings of signals which are produced in the circuit of FIG. 3 when a person is present in the area under surveillance and when no ultrasonic noise is present. When the ultrasonic element 1 emits ultrasonic waves to the area under surveillance responsive to the modulated signal "c" illustrated in FIG. 5A, the output signal "f" of the rectifier 32-1 in the receiver circuit 3' contains the wave X which is reflected by a person who has entered the area as illustrated in FIG. 5B. Since no ultrasonic noise is present, however, the potential of the output signal "g" of the rectifier 32-2 is maintained at zero as illustrated in FIG. 5C. As shown in FIG. 5D, therefore, the wave-form of the output signal "h" of the differential amplifier 37 resembles the wave-form of FIG. 5B. Further, since the potential of the output signal "g" of the rectifier 32-2 is zero, the potential of the output signal "j" of the integrator 38 is maintained at zero as illustrated in FIG. 5E. When the differential amplifier 37 produces the output signal "h" of the wave-form as illustrated in FIG. 5D, the operation processing circuit 4 determines that the reflected-wave pattern (corresponding to FIG. 5D) is different from the reference pattern (corresponding to FIG. 4D), and the alarm 5 is energized.

Figure 6A:
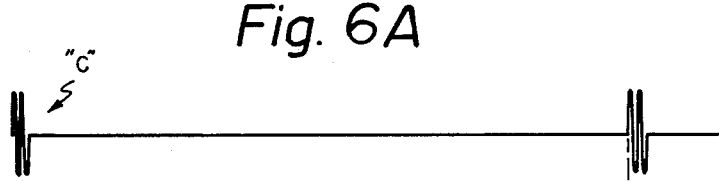
Figure 6B:
Figure 6C:
Figure 6D:
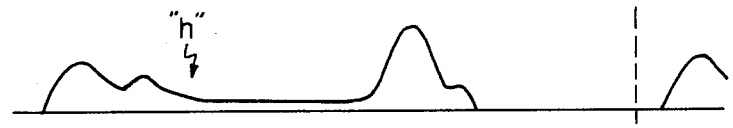
Figure 6E:
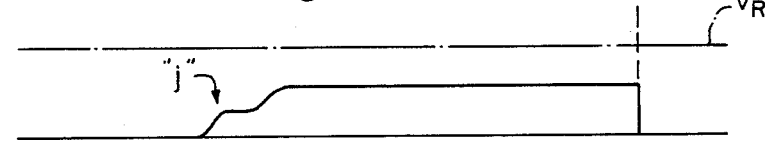

FIGS. 6A through 6E are diagrams illustrating timings of signals which are produced in the circuit of FIG. 3 when there is no person present in the area under surveillance but when there is present ultrasonic noise of relatively small amplitudes such as a ringing of a bell of a telephone. When the ultrasonic element 1 emits ultrasonic waves to the area under surveillance responsive to the modulated signal "c" illustrated in FIG. 6A, the output signal "f" of the rectifier 32-1 in the receiver circuit 3' contains the wave Y which is caused by the ultrasonic noise as illustrated in FIG. 6B. Further, the output signal "g" of the rectifier 32-2 contains only the wave caused by the ultrasonic noise as illustrated in FIG. 6C. The output signal "h" of the differential amplifier 37, however, does not contain the wave caused by the ultrasonic noise as illustrated in FIG. 6D. Namely, the wave-form of FIG. 6D resembles the wave-form of the reference pattern of FIG. 4D. Moreover, the output signal "g" of the rectifier 32-2 has such a small amplitude that the potential of the output signal "j" of the integrator 38 does not reach the reference value $V_R$ as illustrated in FIG. 6E. Accordingly, when the differential amplifier 37 produces the output signal "h" of the wave-form as illustrated in FIG. 6D, the operation processing circuit 4 determines that the reflected-wave pattern (corresponding to FIG. 6D) is in agreement with the reference pattern (corresponding to FIG. 4D), and the alarm 5 is not energized.

Figure 7A:
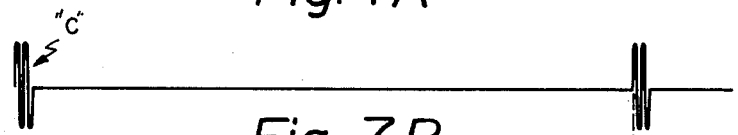
Figure 7B:
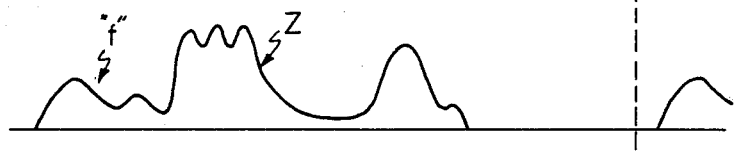
Figure 7C:
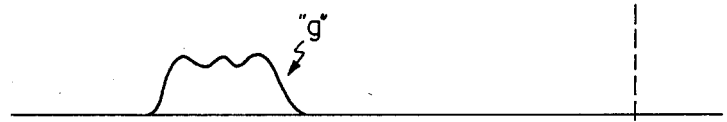
Figure 7D:
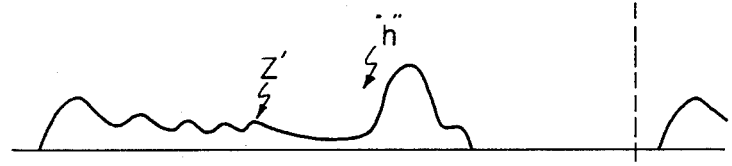
Figure 7E:
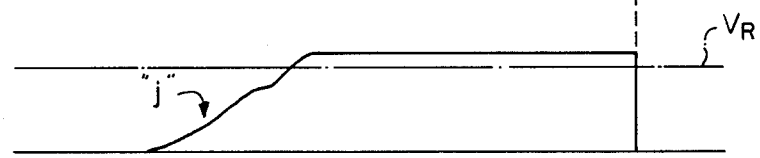

FIGS. 7A through 7E are diagrams illustrating timings of signals which are produced in the circuit of FIG. 3 when there is no person present in the area under surveillance but when ultrasonic noise of a relatively large amplitude such as of a bell of a fire alarm is present. When the ultrasonic element 1 emits ultrasonic waves to the area under surveillance responsive to the modulated signal "c" which is illustrated in FIG. 7A, the output signal "f" of the rectifier 32-1 in the receiver circuit 3' contains a wave Z of large amplitudes caused by the ultrasonic noise as illustrated in FIG. 7B. Further, the output signal "g" of the rectifier 32-2 contains waves of large amplitudes caused by the ultrasonic noise as illustrated in FIG. 7C. Due to the presence of the wave Z of large amplitudes in the output signal "f", the output signal "h" of the differential amplifier 37 contains an abnormal wave Z' as illustrated in FIG. 7D, which has the potential to energize the alarm 5. The potential of the output signal "j" of the integrator 38, however, is greater than the reference value $V_R$ as illustrated in FIG. 7E. Consequently, the comparator 39 produces a signal of a low potential to close the gate 40; the analog-to-digital conversion operation is ceased and the alarm 5 is not energized. In other words, the alarm 5 is not operated even when abnormal waves Z' caused by ultrasonic noise are present in the output signal "h" of the differential amplifier 37.

Figure 8A:
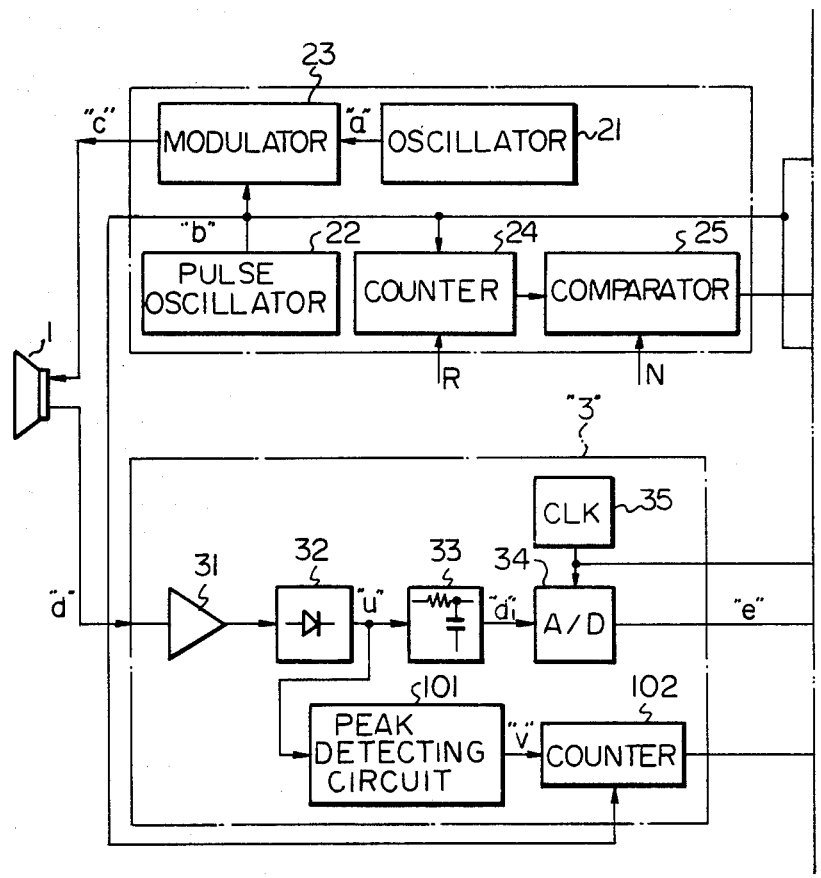
FIGS. 8A and 8B comprise a block diagram illustrating a second embodiment of the ultrasonic surveillance system according to the present invention.
Figure 8B:
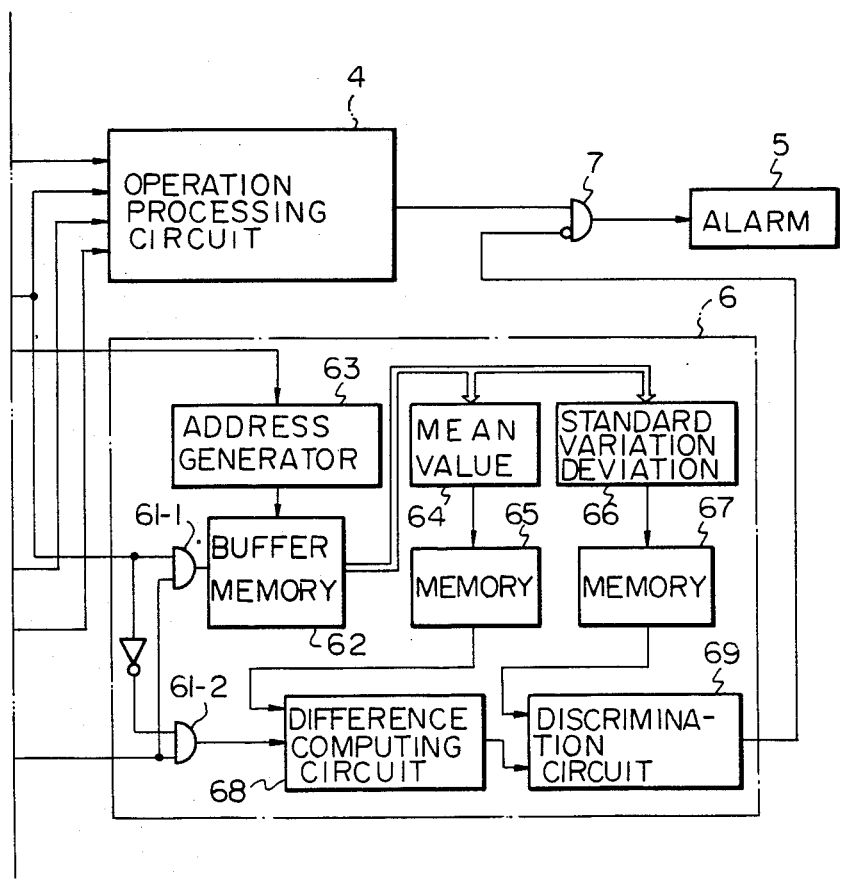

FIG. 8 is a block diagram illustrating a second embodiment of the ultrasonic surveillance system according to the present invention, in which the elements which are the same as those of FIG. 1 are denoted by the same reference numerals. A receiver circuit 3'' is different from the receiver circuit 3 of FIG. 1. Referring to the receiver circuit 3'', a peak detecting circuit 101 for detecting maximum values or minimum values, and a counter 102 are provided responsive to the output of the rectifier 32. The peak detecting circuit 101 consists of a differentiation circuit and a comparator which are connected in series, and the counter 102 is reset by the output signal "b" of the pulse oscillator 22 in the transmitter circuit 2. Referring to FIG. 8B, furthermore, a second operation processing circuit 6 is provided in addition to the first operation processing circuit 4, to statistically compare the number of peak values in the reflected-wave pattern with the number of peak values in the reference pattern.

The second operation processing circuit 6 is constructed similarly to the first operation processing circuit 4. A buffer memory 62 stores the number of peak values of plurality of reference patterns. Namely, the output signal of the comparator 25 assumes the high potential for a predetermined period of time after the counter 24 in the transmitter circuit 2 has been reset, and gates 61-1 and 61-2 are opened and closed, respectively, for the output signal of the counter 102. Hence, the output signals of the counter 24 are stored, via the gate 61-1, in a memory location of the buffer memory 62, the address of which is specified by an address generator 63. The address generator 63 is controlled by the pulse oscillator 22 in the transmitter circuit 2. Thus, the buffer memory 62 stores the number of peak values of a predetermined number of reference patterns. Thereafter, mean values and standard deviations of the contents stored in the buffer memory 62 are calculated by a mean value calculator circuit 64 and a standard deviation calculator circuit 66. The calculated results are stored in memories 65 and 67.

Then, the potential of the output signal of the comparator 25 changes from the high level to the low level, and the gates 61-1 and 61-2 of the operation processing circuit 6 are closed and opened, respectively, for the output signal of the counter 102. Hence, the output signal of the counter 102 is supplied to an input of a difference computing circuit 68 via the gate 61-2, while another input of the difference computing circuit 68 is supplied with a mean value of the number of peak values from the memory 65. Consequently, the difference computing circuit 68 sends the difference between a mean value of the number of peak values in the reflected-wave pattern from the receiver circuit 3'' and a mean value of the number of peak values in the reference pattern stored in the memory 65, to a discrimination circuit 69. When the above-mentioned difference is greater than a standard deviation stored in the memory 67, the discrimination circuit 69 produces a signal of the high potential to close a gate 7. Irrespective of the operation of the first operation processing circuit 4, therefore, the alarm signal is not produced, and the alarm 5 is not energized. According to the second embodiment as mentioned above, the number of peak values in the reflected-wave pattern is statistically compared with the number of peak values of a reference pattern stored in the buffer memory 62, to detect the ultrasonic noise caused by the ringing bell of a telephone or by the bell of a fire alarm, in order to prevent the alarm 5 from being erroneously operated by the ultrasonic noise.

Figure 9A:
FIGS. 9A through 9E are time diagrams of signals which appear in the circuit of FIG. 8.
Figure 9B:
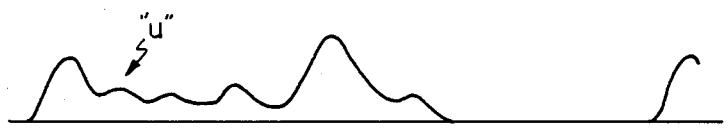
Figure 9C:
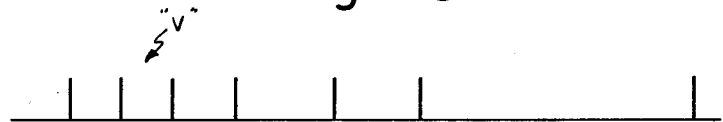
Figure 9D:
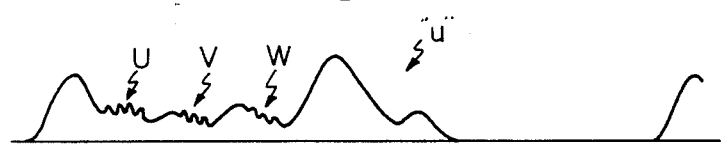
Figure 9E:

FIGS. 9A through 9E are diagrams illustrating timings of signals which are produced in the circuit of FIG. 8. FIG. 9A illustrates modulated signals "c" for emitting ultrasonic waves from the ultrasonic element 1 to the area under surveillance. FIG. 9B illustrates an output signal "u" of the rectifier 32 in the receiver circuit 3'' when no person is present in the area under surveillance and when there is no ultrasonic noise. In this case, as illustrated in FIG. 9C, output signals "v" of the peak detecting circuit 101 produce a train of pulses which correspond to a maximum value of the signal "u" of FIG. 9B. FIG. 9D, on the other hand, illustrates an output signal "u" of the rectifier 32 when there is ultrasonic noise in the area under surveillance. Since varying periods of amplitudes of the ultrasonic noise are short, abnormal portions U, V and W develop each having a very increased number of maximum points as shown in FIG. 9D. In this case, as illustrated in FIG. 9E, the output signal "v" of the peak detecting circuit 101 in the receiver circuit 3'' become a series of pulses. The second operation processing circuit 6 statistically compares the number of pulses in the pulse series of FIG. 9C and FIG. 9E. Therefore, even when the ultrasonic noise, is caused by person entering the area under surveillance is detected by the first operation processing circuit 4, the second operation processing circuit 6 keeps the gate 7 closed, and the alarm 5 is not energized.

Figure 10A:
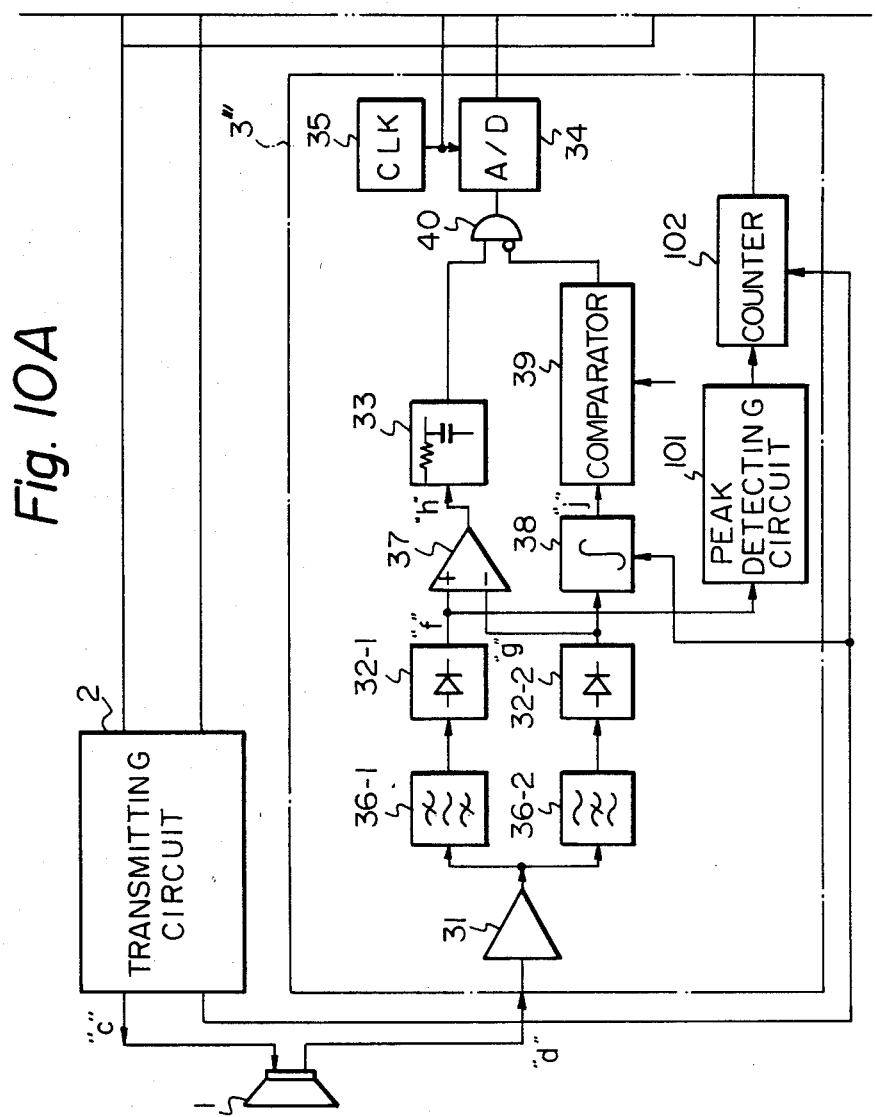

FIG. 10 is a block diagram illustrating a third embodiment of the ultrasonic surveillance system according to the present invention. The third embodiment of FIG. 10 is made up of a combination of the first embodiment of FIG. 3 and the second embodiment of FIG. 8. When a wave-form having very many maximum points is contained in the output signal "f" of the rectifier 32-1, or when a wave-form having large amplitudes is contained in the output signal "g" of the rectifier 32-2, a receiver circuit 3''' regards them as those caused by the ultrasonic noise, so that the alarm 5 is not energized.

In the above embodiments, the contents (reference patterns and reference values) stored in the buffer memories 42 and 62 of the operation processing circuits 4 and 6 can be rewritten at any time by resetting the counter 24 in the transmitter circuit 2.

In the ultrasonic surveillance system according to the present invention as described in the foregoing, the alarm can be prevented from being erroneously operated by the ultrasonic noise such as of the ringing bell of a telephone or the ringing bell of a fire alarm, and the reliability of the device can be enhanced.

I claim:

1. An ultrasonic surveillance system comprising: transmitter means for transmitting pulse-like ultrasonic waves to an area under surveillance; receiving means for receiving ultrasonic waves reflected from the area under surveillance to convert the reflected ultrasonic waves into electrial signals and for subjecting the electrical signals to analog-to-digital conversion; and an operation processing means for statistically comparing a reflection pattern established by the digital signals sent from said receiving means with reference patterns based upon the area under surveillance when there is no obstacle, to produce an alarm signal when these patterns are not in agreement, characterized in that said receiving means comprises:

a first frequency means for permitting frequencies of said pulse-like ultrasonic waves to pass therethrough;

a second frequency selection means for permitting frequencies other than the frequencies of said ultrasonic waves to pass therethrough;

an analog-to-digital convertor converting the output signal of said first frequency selection means;

an integrator for integrating the output signal of said second frequency selection means; and interrupting means for interrupting the signal transmission from said first frequency selection means to said analog-to-digital converter when the output level of said integrator exceeds a predetermined value.

2. A system as set forth in claim 1, wherein said operation processing means comprises:

a buffer memory for storing reference patterns;

a mean value calculator means for calculating mean values of the data stored in said buffer memory for every sampling point;

a first memory for storing the calculated means values of said mean value calculating means;

a standard deviation calculator means for calculating standard deviations of the data stored in said buffer memory for every sampling point;

a second memory for storing the calculated standard deviation values of said standard deviation calculator means;

a difference computing means for calculating the difference between the data sent from said analog-to-digital converter and the data stored in said first memory for every sampling point; and a discrimination means for comparing the calculated differences of said difference computing means with the standard deviations stored in said second memory for every sampling point to produce an alarm signal when one of the calculated differences is greater than the corresponding standard deviation.

3. An ultrasonic surveillance system comprising: transmitter means for transmitting pulse-like ultrasonic waves to an area under surveillance; receiving means for receiving ultrasonic waves reflected from the area under surveillance to convert the reflected ultrasonic waves into electrical signals and for subjecting the electrical signals to analog-to-digital conversion; and a first operation processing means for statistically comparing a reflection pattern established by the digital signals sent from said receiving means with reference patterns based upon the area under surveillance when there is no obstacle, to produce an alarm signal when these patterns are not in agreement, characterized in that said receiving means comprises:

a peak detector for detecting peak values in the received electrical signals; and a counter for counting the number of the peak values detected by said peak detector, said system further comprising:

a second operation processing means for statistically comparing the number of peak values produced from said counter of said receiving means with a reference value; and an interrupting means for interrupting the alarm signal of said first operation processing means when the number of peak values exceeds the reference value.

4. A system as set forth in claim 3, wherein said first operation processing means comprises:

a buffer memory for storing reference patterns;

a mean value calculator means for calculating mean values of the data stored in said buffer memory for every sampling point;

a first memory for storing the calculated mean values of said mean value calculating means;

a standard deviation calculator means for calculating standard deviations of the data stored in said buffer memory for every sampling point;

a second memory for storing the calculated standard deviation values of said standard deviation calculator means;

a difference computing means for calculating the difference between the data sent from said analog-to-digital converter and the data stored in said first memory for every sampling point; and a discrimination means for comparing the calculated differences of said difference computing means with the standard deviations stored in said second memory for every sampling point to produce an alarm signal when one of the calculated differences is greater than the corresponding standard deviation.

5. A system as set forth in claim 3, wherein said second operation processing means comprises:

a buffer memory for storing the number of peak values of a plurality of reference patterns;

a mean value calculator means for calculating a mean value of the data stored in said buffer memory;

a first memory for storing the calculated mean value of said mean value calculating means;

a standard deviation calculator means for calculating a standard deviation of the data stored in said buffer memory;

a second memory for storing the calculated standard deviation value of said standard deviation calculator means;

a difference computing means for calculating the difference between the data sent from said counter and the data stored in said first memory; and a discrimination means for comparing the calculated difference of said difference computing means with the standard deviation stored in said second memory to produce an alarm signal when one of the calculated differences is greater than the corresponding standard deviation.

* * * * *